Patented May 11, 1954

2,678,332

UNITED STATES PATENT OFFICE 2,678,332

ESTERIFICATION OF OLEFINS USING ION
EXCHANGE RESINS CATALYSTS

Delmer L. Cottle, Highland Park, N. J., assignor
to Standard Oil Development Company, a corporation of Delaware No Drawing. Application December 23, 1949,
Serial No. 134,878

10 Claims. (Cl. 260—475)

This invention relates to a novel process for the esterification of olefins with organic acids in which ion exchange resins are used as catalysts. More specifically, the invention is concerned with a low temperature liquid phase esterification in which the reactants are an organic acid and an olefin and the catalyst is one selected from a group known as cationic exchange resins, and preferably is the acid form of such catalysts.

This invention is for a novel process of preparing organic esters by the direct esterification of olefins. It has been discovered that a number of marked advantages are obtained when, in esterification reactions employing olefins and organic acids, an acid ion exchange resin is used rather than the conventional strong acid catalyst. The advantages which are obtained by the application of this new process include the ease of reaction, the convenience with which the catalyst can be removed from the reaction products, the lack of color bodies produced in the ester products by the presence of the resin catalyst, the economical features of recycling the recovered solid resin catalyst for reuse in further esterification and the lack of corrosion of metal equipment.

The direct esterification of olefins with organic acids can be resolved into two major problems: (1) the esterification reaction of the olefin with the acid; and (2) separating the resulting organic ester from the catalyst. When the usual type acidic catalyst such as sulfuric acid or benzene sulfonic acid, is used, for instance, in the esterification of 2-butene with acetic acid, the sulfuric acid catalyst may be washed out of the organic reaction products with water. It is uneconomical to recover the sulfuric acid by concentration. It is likewise uneconomical to discard the sulfuric acid since it contains acetic acid. These difficulties are discussed in some detail in Ind. Eng. Chem. 30, 55-8 (1938), and a number of attempts have been made to overcome these difficulties. None of the suggestions for removing the ester from the ordinary catalysts are satisfactory.

These disadvantages of conventional esterification processes using an acid catalyst are entirely overcome by the process of the present invention in which a solid acid acting resin is employed as the esterification catalyst. After the esterification reaction is complete, the ester-acetic acid mixture can be directly decanted from the solid resin particles or filtered from them and thereafter worked up in the usual way with a convenient method for the recovery of unreacted acetic or other water soluble organic material present in the reaction products. The use of resin catalysts has one other marked advantage over solid vapor phase type catalysts in that the resin catalysts permit operation at lower temperatures than are required for vapor phase reactions, and thus make it possible to capitalize on the more favorable ester yields which result at the lower temperatures, lower temperatures being more favorable to displace the equilibrium of the esterification reaction in the direction of the formation of the desired product, the ester. It has been found that, while various types of ion exchange resins may be used, they must all be of the acid ion type, that is, they must all be a cation exchange resin and they should preferably be employed in the acid form. Apparently, the exact nature of the cation exchange resin is of relatively minor importance as long as it contains strongly acidic groups. It is quite surprising that the catalysts are generally insoluble in the reaction mixture and yet show a remarkable degree of catalytic activity. The major portion of these ion exchange resins, which are commercially available, show relatively complete insolubility in organic solvents which might be present in esterification mixtures. Thus, the resins used as a catalyst in the esterification of olefins with acids include the common thermosetting resins such as phenol formaldehyde, melamine formaldehyde, urea formaldehyde, etc., form the basis for the more useful insoluble ion exchange resins. Generally, the physical properties of the cation exchange resin and frequently its chemical stability as well, depend upon the nature of the resin skeleton.

The more common types of exchange resins used as basic structures for the ion exchange catalysts are the carbon-carbon skeletons and the carbon-nitrogen skeletons having amine linkages.

To this basic network skeleton, there must be attached ionic groups in order to produce an exchange resin. Thus, cation exchange resins which are useful for catalysts may be made with sulfonic acid groups, carboxylic acid groups, phenolic hydroxy groups, and thio groups. Generally speaking, the ionic character of the group is the same when it is attached to the resin base as it is when the group is present in a simple organic compound. Thus, exchange resins containing sulfonic acid groups are more strongly acidic than those containing carboxylic acid groups and the former will, in general, give better results than the latter when employed in the esterification of olefins with organic acids. In general, one might suspect that the resin network base should be loaded with as many cationic active groups as possible in order to achieve maximum esterification catalytic reaction. This may be true except that certain undesirable qualities, such as the extent of swelling, depend on the concentration of the active groups in a resin as well as upon the extent of the cross-linking of the network. All ion active groups tend to solubilize the structure while the cross-links have the opposing effect, that of preventing this solution. Therefore, a compromise is usually required between the number of active groups directly affecting the cationic catalyst capacity and the complex network linkages affecting the swelling and solubility of the resin in the reaction mixture. Various types of specific resins have been tested experimentally and have been found to be successful in their application to esterification reactions involving olefins and acids. The resins containing sulfonic acid groups have been found to be particularly effective. Among these useful catalytic resins are included the sulfonated coal products, the phenol-formaldehyde sulfonates in which the sulfonic acid groups are attached to the benzene nuclei in the resin through a methylene group and the nuclear sulfonated resins in which the sulfonic acid groups are attached directly to the benzene rings. Also useful are the sulfonated resinous polymers of coumarone-indene with cyclopentadiene, sulfonated polymers of coumarone-indene with furfural, sulfonated polymers of coumarone-indene with cyclopentadiene and furfural, and sulfonated polymers of cyclopentadiene with furfural.

Thus, the organic cationic exchange catalysts which are useful in the present process of esterifying olefins with organic acids are high molecular weight water-insoluble resins or carbonaceous materials containing at least one functional group selected from the series sulfonic acid, phenolic, hydroxyl, or carboxylic acid groups. A number of these useful catalysts are marketed as water softener agents or so-called base exchangers. These materials are usually commercially available in neutralized forms and for best results as catalysts in this esterification, they must be activated by treatment with acid, that is converted to acid form by reaction with acids such as hydrochloric or sulfuric acid, and thereafter water-washed to remove sodium sulfate and chloride ions and excess hydrogen ions. All of these resin catalysts may lose their catalytic efficiency upon long continued use, but they may be readily regenerated or reactivated by washing with an acidic material such as dilute acid and thereafter water-washed prior to further use in esterification reactions.

The olefins which may be used in this esterification reaction include ethylene, propylene, 1-butene, 2-butene, isobutene, 1-pentene, isopentene, 2-pentene, 1-hexene, isohexene, 2-hexene, isoprene, butadiene, and styrene or mixtures thereof. There is no exact limit to the molecular weight or number of carbon atoms in the olefin used. The acids which may be used for esterification by the olefins include a wide variety of both monobasic and polybasic acids. Acids which may be used include formic acid, acetic acid, propionic acid, butyric acid, isobutyric acid, valeric acid, caproic acid, capric acid, benzoic acid, furoic acid, the toluic acids, oxalic acid, malonic acid, succinic acid, glutaric acid, adipic acid, and the various phthalic acids.

As a general rule, it is best to use this improved catalytic esterification process for olefins and acidic reactants having from 2 to 12 carbon atoms.

The temperatures which are most useful are of a relatively low range when considered in view of the usually required high esterification temperatures. Thus, temperatures of 80° to 120° C. are quite satisfactory for obtaining good yields of ester products. However temperatures from room temperature to 210° C. are applicable. At the higher temperatures the yield of ester is lower and the reaction time shorter. Temperatures between 140° C. and 220° C. also require resins of a high order of stability. The time required for the reaction is, of course, dependent upon the temperature used as well as upon the exact ion exchange catalyst and will vary inversely with the temperature. These variables are related to the exact extent of esterification reaction which is required in any one contacting period of the reactants with the catalyst. The esterification reaction using the cation exchange catalyst can be carried out by contacting the olefin, the acid, and the catalyst in a heated vessel provided with means for insuring vigorous agitation. It may be necessary to provide suitable pressure maintenance devices in case the olefin used is a vapor at the reaction temperature. After the period of time required for completing the esterification, the contents of the vessel are removed, and the liquid products are separated by any suitable means, such as by filtration or decantation, to remove the solid ion exchange catalyst. There is then carried out a fractional distillation of the resulting liquid reaction product to obtain the pure ester and recover unreacted acid reactant. If the olefin is a gas, the pressure utilized in the reactor should be sufficient to maintain the olefin in a liquid phase at the operating temperature; such pressures range from slightly above atmospheric pressure up to 750 p. s. i. g. The chief purpose for the use of such elevated pressures is to maintain the olefin as well as any other low-boiling reactants in the liquid phase.

The mol ratio of olefin to acid may range from 1:1 to 5:1 or 1:5, thus an excess of either reactant may be employed. In general, an excess of the olefin is to be desired. If there is more than one carboxyl group per molecule of acid, suitable adjustments in mol ratios must be made. The catalyst may be separated readily and completely from the liquid reaction products by filtration and may be reused repeatedly in subsequent esterification reactions without regeneration or other treatment. One modification by which the reaction may be carried out is by the enclosure of the solid catalyst in a reactor such as a tube which is maintained at the desired reaction temperature while the reactants are allowed to pass through the tube, remaining therein for a sufficient period of time for the desired degree of esterification to take place.

Another modification of the process which is particularly advantageous when employed in an operation using liquid reactants, is carried out by passing a mixture of the olefin and acid through a tower packed with the ion exchange catalyst at a rate and temperature sufficient to effect the esterification. The high-boiling ester can then be removed as a bottoms product from the tower. The particle size of the solid catalyst used for the reaction will vary somewhat, depending upon the exact mode of carrying out the operation. Particle sizes of from 20–50 mesh have been used but both finer and coarser mesh sizes may be used to advantage depending upon the equipment and substances being converted. The size of the surface of the particles which are exposed is of importance in determining the speed and completeness of the reaction and is thereby related to the temperature and time of the reaction. If it is so desired, the catalyst material may be prepared by bonding the original catalytic resin with a binder such as a phenol-formaldehyde resin, after which the solid so formed may be crushed to the desired size. Thus, porosity and high surface area are maintained at a maximum in conjunction with the necessity of obtaining required mechanical strength.

Still another modification is the use of a batch or continuous slurry operation in which the resin is kept in motion by mechanical means or by the motion of the gases or liquids taking part in the reaction. The liquid product in either the continuous or batch process may be withdrawn at the bottom through a filter. In the case of a continuous process the reactants may enter at the bottom of a vessel containing the resin in motion, the reaction taking place in the catalyst zone and the liquid products allowed to rise and overflow from the catalyst bed after the catalyst has been separated by settling or filtration.

Although for one-time use these cation exchange catalysts are more expensive than sulfuric, hydrochloric, or sulfonic acid catalysts, normally employed in reactions for esterification of olefins with acids, catalysts by these insoluble materials greatly simplifies operational procedure as well as many product purification problems, especially with high-boiling or viscous compounds. The removal of the usual type acid catalysts from such products often involves a troublesome neutralization and filtration procedure. Furthermore, failure to remove acid catalysts to a fairly complete degree generally results in excessive decomposition during the subsequent separation or purification of the reaction products. However, the use of cation exchangers as catalysts makes it possible to remove the catalysts by decantation or simple filtration without harm to the reaction products. It is even possible to distill the ester products directly in the presence of the cation exchanger catalyst without harm to the ester. In addition, the use of acid regenerated cation exchangers permits the direct esterification of acid-sensitive compounds which may resinify or form tars when contacted with the strong acids normally used as esterification catalysts. The following examples are for the purpose of illustrating the invention. All parts are by weight unless otherwise stated.

EXAMPLE I

An experiment was carried out using 2-butene and acetic acid as the olefin and organic acid reactants. A phenol-formaldehyde sulfonate in which the sulfonic acid group is attached to the benzene nucleus through the methylene group was used. The resin as obtained commercially was refluxed with benzene in order to remove the 40% water which was incorporated into the resin. After thus removing the water, the resin was removed from the benzene by filtration and air-dried at room temperature. The resin was obtained as the acid form of the resin. The 2-butene, acetic acid, and 113 grams of the dried, pretreated resin were shaken together in a bomb type reactor at 100° C. for 16 hours. After the reaction time had elapsed, the ester-acetic acid mixture was decanted from the resin particles and the liquid reaction mixture distilled to obtain the secondary-butyl acetate ester product in yields of 50 mol. percent. Experiments were also conducted at reaction temperatures of 80, 90, 110 and 120° C. and at times from 4 to 16 hours. The ester products were obtained in every case.

EXAMPLE II

In each of the experiments shown in Table II, the olefin and organic acid indicated were reacted in the presence of the indicated resin for the period of time and at the temperatures illustrated to give the expected ester in good yields. The esterification reactions were carried out in a similar fashion as those described in Example I, the olefin and organic acid being shaken together in a bomb type reactor with the acid resin catalyst specified. At the end of the reaction period, the liquid products were removed by decantation from the resin particles and the ester worked up finally by distillation of the liquid products except for run No. 3 in which the ester content of the decanted liquid was determined by analysis. The ester yields in all cases were supported by saponification data.

Table

| Run No. | Olefin | Organic Acid | Resin | Time, Hrs. | Temp., °C. | Ester Yield, Mol Percent |
|---|---|---|---|---|---|---|
| 1 | 2-butene | Acetic | [1] A | 16 | 100 | 49 |
| 2 | do | do | [2] B | 12 | 120 | 37 |
| 3 | do | do | B | 4 | 120 | 44 |
| 4 | do | do | [3] C | 16 | 100 | 18 |
| 5 | 1-pentene | do | B | 16 | 120 | 29 |
| 6 | 2-butene | Benzoic | B | 4 | 120 | 56 |
| 7 | do | Succinic | B | 4 | 120 | 23 |

[1] Phenol formaldehyde sulfonate in which the sulfuric acid group is attached to the benzene nucleus through a methylene group.
[2] Nuclear sulfonated resin in which the sulfonic acid group is attached directly to the benzene ring.
[3] Sulfonated coal product.

Other experiments carried out with isoprene and with styrene as the olefin and acetic acid as the organic acid, using a nuclear sulfonated resin as the catalyst, also resulted in expected ester products.

A run also was made at atmospheric pressure wherein 2-butene was scrubbed countercurrent fashion with acetic acid at 100–118° C. in a column filled with a nuclear sulfonate resin. The liquid reaction product was withdrawn at the bottom of the column. Analysis of this product showed that the expected ester was formed.

What is claimed is:

1. An improved process for the preparation of secondary butyl acetate which comprises contacting 2-butene and acetic acid in the presence of a cationic exchange resin consisting essentially of a sulfonated coal substantially free of water at temperatures of approximately 100° C., separating the liquid reaction products from the solid sulfonated coal catalyst and distilling the liquid reaction products to isolate the pure ester product therefrom.

2. An improved process for the preparation of secondary butyl acetate which comprises contacting 2-butene and acetic acid in the presence of a cationic exchange resin consisting essentially of a nuclear sulfonated phenol-formaldehyde resin substantially free of water at temperatures of approximately 120° C., separating the liquid reaction products from the sulfonated phenol-formaldehyde resin, and distilling the said liquid reaction products to isolate the pure ester product therefrom.

3. An improved process for the preparation of secondary amyl acetate which comprises contacting 1-pentene and acetic acid in the presence of a cationic exchange resin consisting essentially of a nuclear sulfonated phenol-formaldehyde resin substantially free of water at temperatures of approximately 120° C., separating the liquid reaction products from the sulfonated phenol-formaldehyde resin and distilling the liquid reaction products to isolate the pure ester product therefrom.

4. An improved esterification process which comprises contacting 2-butene with a hydrocarbon carboxylic acid in the presence of a cationic exchange resin consisting essentially of a nuclear sulfonated phenol-formaldehyde resin substantially free of water at temperatures of approximately 120° C., said resin being substantially insoluble in the reactants, and thereafter isolating the liquid organic products containing the ester from the resin catalyst.

5. An improved esterification process which comprises contacting 2-butene with a dibasic hydrocarbon carboxylic acid in the presence of a cationic exchange resin consisting essentially of a sulfonated phenol-formaldehyde resin substantially free of water at temperatures of approximately 120° C., said resin being substantially insoluble in the reactants, and thereafter isolating the liquid organic products containing the ester from the resin catalyst.

6. An improved process for the preparation of secondary butyl acetate which comprises contacting 2-butene and acetic acid in the presence of a cationic exchange resin consisting essentially of the acidic form of a phenol-formaldehyde sulfonate resin substantially free of water at temperatures of approximately 100° C., separating the liquid reaction products from the sulfonate resin, and distilling the said liquid reaction products to isolate the pure ester product therefrom.

7. An improved esterification process which comprises reacting together an olefin reactant with a hydrocarbon carboxylic acid reactant, each of said reactants containing 2 to 12 carbon atoms per molecule, in the presence of a solid acidic cationic exchange resin substantially free of water as the esterification catalyst at temperatures of about 80° C. to about 210° C., separating the solid resin catalyst from the resulting liquid reaction products, and isolating a resulting organic ester from said liquid reaction products.

8. An improved esterification process which comprises reacting an olefin reactant with a hydrocarbon carboxylic acid reactant, each of said reactants containing 2 to 12 carbon atoms per molecule, at a reaction temperature in the range of 80° C. to about 120° C. and in the presence of a substantially free of water cationic exchange resin containing sulfonic acid groups, said resin being substantially insoluble in the reactants, and thereafter isolating a resulting ester product from the resin catalyst.

9. A process as described in claim 8 in which the hydrocarbon carboxylic acid is a dibasic hydrocarbon carboxylic acid.

10. A process described in claim 8, in which an excess of the olefin reactant over the stoichiometric amount required for the esterification reaction is used.

References Cited in the file of this patent

UNITED STATES PATENTS

| Number | Name | Date |
|---|---|---|
| 1,951,747 | Brezinski | Mar. 20, 1934 |
| 2,014,850 | Kane | Sept. 17, 1935 |
| 2,018,065 | Ipatieff | Oct. 22, 1935 |

FOREIGN PATENTS

| Number | Country | Date |
|---|---|---|
| 372,717 | Germany | Mar. 31, 1923 |

OTHER REFERENCES

Levesque et al., Ind. Eng. Chem. 40, 96–99 (1948).

Sussman, Ind. and Eng. Chem., 38, 1228–1230 (1946).